(12) United States Patent
Porat et al.

(10) Patent No.: US 12,162,038 B2
(45) Date of Patent: Dec. 10, 2024

(54) SORTING SYSTEM

(71) Applicant: Aquabot Ltd., Afula (IL)

(72) Inventors: Joseph Zvi Porat, Highland Beach, FL (US); David Shlomo Gabrieli, Ramat Yishai (IL); Shay Gabrieli, Ramat Yishai (IL)

(73) Assignee: Aquabot Ltd., Afula (IL)

( * ) Notice: Subject to any disclaimer, the term of this patent is extended or adjusted under 35 U.S.C. 154(b) by 273 days.

(21) Appl. No.: 17/442,603

(22) PCT Filed: Feb. 26, 2020

(86) PCT No.: PCT/IL2020/050216
§ 371 (c)(1),
(2) Date: Sep. 23, 2021

(87) PCT Pub. No.: WO2020/194287
PCT Pub. Date: Oct. 1, 2020

(65) Prior Publication Data
US 2022/0184664 A1      Jun. 16, 2022

Related U.S. Application Data

(60) Provisional application No. 62/825,685, filed on Mar. 28, 2019, provisional application No. 62/830,755, filed on Apr. 8, 2019.

(51) Int. Cl.
*B07C 3/02* (2006.01)
*B61B 13/00* (2006.01)
(Continued)

(52) U.S. Cl.
CPC ............... *B07C 3/02* (2013.01); *B61B 13/00* (2013.01); *B65G 1/0485* (2013.01);
(Continued)

(58) Field of Classification Search
CPC ......... B07C 3/02; B61B 13/00; B65G 1/0485; B65G 1/1371; B65G 11/023;
(Continued)

(56) References Cited

U.S. PATENT DOCUMENTS 4,679,149 A * 7/1987 Merz .................... B65G 1/1371
700/226
10,209,682 B1 * 2/2019 Hebert .................... B66F 9/063
(Continued)

FOREIGN PATENT DOCUMENTS

DE    102014111385    2/2016
WO    WO03/011484    2/2003

OTHER PUBLICATIONS

International Search Report for PCT application No. PCT/IL2020/050216 mailed on Jun. 7, 2020.

*Primary Examiner* — Saul Rodriguez
*Assistant Examiner* — Ashley K Romano
(74) *Attorney, Agent, or Firm* — PEARL COHEN ZEDEK LATZER BARATZ LLP

(57) ABSTRACT

A sorting system includes one or a plurality of transporter units, at least one loading station for loading a parcel onto transporter units, a plurality of destination stations, and a network of paths, each path including at least one track, the network including a plurality of junctions where at least two of the paths intersect. Each transporter unit is controllable to travel along the paths of the network of paths and to continue travelling along one of the at least two paths at a junction. A controller is configured to calculate a route within the network of paths between a loading station and a selected destination station, and to control the transporter unit to travel along the calculated route.

19 Claims, 10 Drawing Sheets

(51) Int. Cl.
*B65G 1/04* (2006.01)
*B65G 1/137* (2006.01)
*B65G 11/02* (2006.01)
*G05D 1/00* (2006.01)
*G05D 1/02* (2020.01)

(52) U.S. Cl.
CPC ......... *B65G 1/1371* (2013.01); *G05D 1/0217* (2013.01); *B65G 11/023* (2013.01); *B65G 2203/0216* (2013.01); *B65G 2203/0283* (2013.01)

(58) Field of Classification Search
CPC .... B65G 2203/0216; B65G 2203/0283; G05D 1/0217; G05D 2201/0216
See application file for complete search history.

(56) References Cited

U.S. PATENT DOCUMENTS

| | | | |
|---|---|---|---|
| 11,124,401 B1* | 9/2021 | Jarvis | G05D 1/0234 |
| 2014/0288696 A1 | 9/2014 | Lert | |
| 2015/0239667 A1 | 8/2015 | Naylor | |
| 2018/0029797 A1 | 2/2018 | Hance et al. | |
| 2018/0257863 A1 | 9/2018 | Lert, Jr. | |
| 2018/0264520 A1 | 9/2018 | Zhu et al. | |
| 2018/0306591 A1* | 10/2018 | Jose | G01C 21/3848 |
| 2019/0179329 A1* | 6/2019 | Keivan | G05D 1/0274 |
| 2020/0207250 A1* | 7/2020 | Jarvis | G06Q 50/28 |

* cited by examiner

SORTING SYSTEM

CROSS-REFERENCE TO RELATED APPLICATIONS

This application is a U.S. National Phase Application of PCT International Patent Application No. PCT/IL2020/050216, International Filing Date Feb. 26, 2020, claiming the benefit of U.S. Provisional Application No. 62/825,685, filed Mar. 28, 2019 and U.S. Provisional Application No. 62/830,755, filed Apr. 8, 2019 which are hereby incorporated by reference.

FIELD OF THE INVENTION

The present invention relates to sorting systems.

BACKGROUND OF THE INVENTION

Hubs or sorting stations are tasked with directing incoming packages to their destinations. Incoming packages may arrive from several sources, having final destinations that may be distributed worldwide. For example, electronic commerce (e-commerce) may allow a customer that is located anywhere in the world to order an item remotely, e.g., via the internet or another network. The ordered items may originate from many different warehouses or manufacturing facilities. In the case of large e-commerce marketplace websites, the ordered items may originate with many different providers. Generally, the goal of an e-commerce vendor is to provide as many ordered articles as possible in a minimum amount of time.

SUMMARY OF THE INVENTION

There is thus provided, in accordance with an embodiment of the invention, a sorting system including: one or a plurality of transporter units; at least one loading station for loading a parcel onto a transporter unit of the one or a plurality of transporter units; a plurality of destination stations; a network of paths, each path including at least one track, and including a plurality of junctions where at least two of the paths intersect, the transporter unit controllable to travel along the paths of the network of paths and to continue travelling along one of the at least two paths at a junction of the plurality of junctions; and a controller configured to calculate a route within the network of paths between a loading station of the at least one loading station and a selected destination station of the plurality of destination stations, and to control the transporter unit to travel along the calculated route.

Furthermore, in accordance with an embodiment of the invention, the network of paths includes paths on at least two levels at different heights, and wherein the plurality of junctions includes at least one vertical junction between a path one of the levels and a path on another of the levels.

Furthermore, in accordance with an embodiment of the invention, the vertical junction includes an elevator.

Furthermore, in accordance with an embodiment of the invention, the network of paths includes a plurality of distribution paths, the plurality of destination stations being distributed along each distribution path of the plurality of distribution paths.

Furthermore, in accordance with an embodiment of the invention, each distribution path of the plurality of distribution paths intersects a thoroughfare path.

Furthermore, in accordance with an embodiment of the invention, a loading station of the at least one loading station is located at an end of the thoroughfare path.

Furthermore, in accordance with an embodiment of the invention, each distribution path of the plurality of distribution paths is located at an end of a thoroughfare path of a grid of intersecting thoroughfare paths.

Furthermore, in accordance with an embodiment of the invention, a loading station of the at least one loading station is located at a distal end of a distribution path of the plurality of distribution paths.

Furthermore, in accordance with an embodiment of the invention, the system includes a reader configured to read a label on the parcel.

Furthermore, in accordance with an embodiment of the invention, the controller is configured to select a destination station for delivery of the parcel based on contents of the label.

Furthermore, in accordance with an embodiment of the invention, a destination station of the plurality of destination stations includes a bin.

Furthermore, in accordance with an embodiment of the invention, the transporter unit includes a vehicle that is configured to travel on the network of paths.

Furthermore, in accordance with an embodiment of the invention, the network of paths is configured to enable travel of the transporter unit in a single direction along each track of the at least one track.

Furthermore, in accordance with an embodiment of the invention, a path of the network of paths includes two tracks, wherein the direction of travel along one of the two tracks is opposite the direction of travel along the other track of the two tracks.

Furthermore, in accordance with an embodiment of the invention, the two tracks terminate in a loop that enables the transporter unit to travel from one of the two tracks to the other.

Furthermore, in accordance with an embodiment of the invention, a junction of the plurality of junctions includes a roundabout.

Furthermore, in accordance with an embodiment of the invention, the network of paths includes a parking area for parking at least one transporter unit.

Furthermore, in accordance with an embodiment of the invention, the network of paths includes a maintenance area to enable maintenance on a transporter unit.

Furthermore, in accordance with an embodiment of the invention, the controller is configured to detect a location of the transporter unit on the network of paths.

Furthermore, in accordance with an embodiment of the invention, the controller is configured to calculate the route such that a travel time of the transporter unit along the network of paths from the loading station to the selected destination station is minimized.

Furthermore, in accordance with an embodiment of the invention, wherein a path of the network of paths includes a peripheral path that surrounds other paths of the network of paths.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1A:
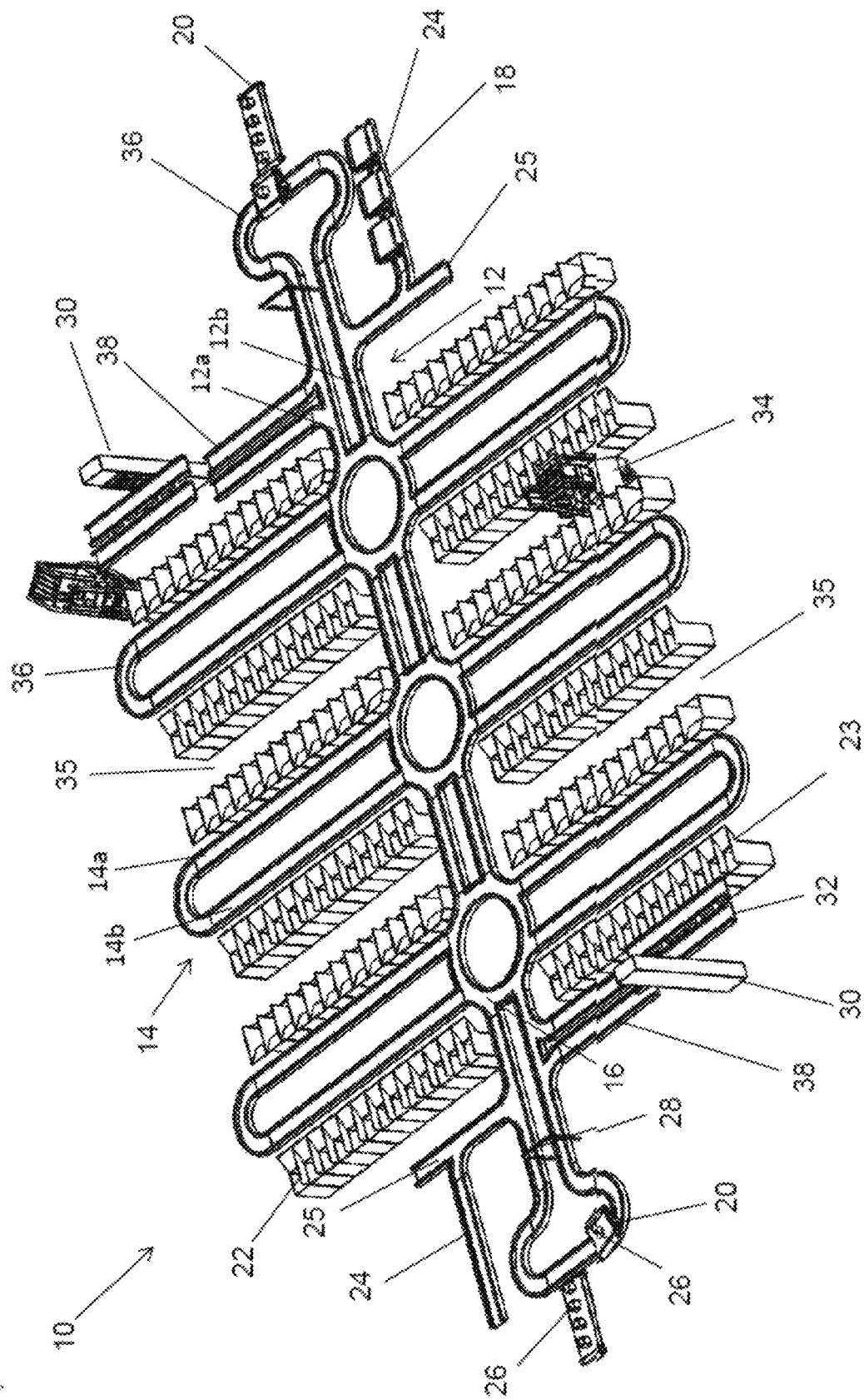
FIG. 1A schematically illustrates a level of a sorting system, in accordance with an embodiment of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

Some embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

In accordance with an embodiment of the present invention, a sorting system includes a two- or three-dimensional network of paths. Each path is connected with one or more intersecting paths of the network at one or more junctions. Each path includes one or more tracks, typically substantially parallel to one another. Transporter units are configured to travel along tracks of the network of paths. Typically, each track is configured for one-way travel of transporter units along that track. When each transporter unit arrives at a junction, the transporter unit may be controlled to continue to travel along the original track along which the transporter unit arrived at the junction, to switch to another track of the path that includes the original track (e.g., to travel in the opposite direction along that path, or to switch to a track of one of the intersecting paths.

The network of paths connects one or more loading stations to a plurality of destination stations. A parcel may be loaded onto one of the transporter units at one of the loading stations. For example, the parcel may arrive at the loading station from a sender. A sender may include a manufacturing facility, warehouse or other storage facility, a vendor, donor, or presenter, or another point of origin. As used herein, a parcel should be understood as including any article, material, object, or other deliverable entity with a well-defined volume (e.g., excluding fluids or slurries that that are delivered by pipeline or other continuous flow), whether or not enclosed in packaging.

One or more sensors (e.g., optical barcode scanners, alphanumeric character readers, radiofrequency identification (RFID) readers, or other sensors) may read an identification label (e.g., barcode, RFID tag, alphanumeric or color coding, or other identifying labelling) to identify each transporter unit and the parcel with which the transporter unit is loaded. Other sensors may monitor the position and motion of each transporter unit along the paths of the sorter system. The information content of the label may include a destination for each parcel, or destination data may be extracted from a database of parcels to be delivered (e.g., that provides information regarding each identified parcel). Similarly, the information content may include or indicate any special handling instructions for the parcel. A controller of the sorting system may select a destination station for each parcel, and the loaded transporter unit holding that parcel, based on the information content of identification label.

The loaded transporter unit may be operated to transport the parcel along the network of paths to a destination station that was selected by the controller for that parcel. For example, a parcel may be labeled such to enable a processor of the sorting system to determine an indicated destination station. For example, the destination station may be selected on the basis of one or more of a geographical location of a final receiver of the parcel, a service for continued transport of the parcel after removal from the sorting system, a mode of transportation for continued transport and delivery of the parcel after removal from the sorting system, or other considerations.

In some cases, the destination stations may include an arrangement of collection bins, chutes, shelves, or similar structure that are arranged along one or both sides of a path. In some cases, the network of paths may include thoroughfare paths (e.g., each crossing or surrounding all or part of the network of paths) along which no destination stations are arranged. Distribution paths, along which destination stations are arranged, may branch off from at least some of the thoroughfare paths. Both thoroughfare paths and distribution paths may be located on two or more different levels, where different levels are located at different heights (e.g., on different stories of a building or facility, or otherwise at different heights).

In some cases, distribution paths may be arranged about the periphery of the network of paths. For example, a central region of the network of paths may include a grid of thoroughfare paths that intersect at junctions. In this case, the delivery paths along which the destination stations are arranged may be located at ends of the thoroughfare paths that extend outside of the central grid.

In some cases, the network of paths may include one or more peripheral or bypass paths (e.g., analogous to a ring road or beltway) that may enable a transport unit to rapidly travel from a loading station to a distribution path along which a selected destination station lies. For example, a transport unit may be directed to a distribution path via a peripheral path in order to avoid any traffic congestion along the thoroughfare paths.

A transporter unit may include any type of moveable platform or supporting structure that is capable of supporting a parcel and of movement along the network of paths. For example, a transport unit may include a wheeled, slidable, magnetically levitated, pneumatically levitated, floatable, or otherwise bottom-supported vehicle or conveyance that may self propel, or be otherwise propelled, along a suitable network of paths. In this case, the tracks of the network of paths may include marked or bounded roadways or aisles, double rails or monorails, fluid channels, or other suitable pathways over which a bottom-supported transporter unit may travel. The transporter unit may include one or more walls, railings, baskets, cavities, or other structure or enclosures to securely hold a parcel on the transporter unit. As another example, a transporter unit may include a support platform, hook, claw, magnet, suction device, or other suspended device that is capable of supporting a parcel above a floor. In this case, the network of paths may include an arrangement of rails or wires that are located above a floor, along which a suspended transporter unit may travel.

For example, transporter units may be motorized or otherwise self-propelled along the paths of the sorting system. In other examples, the network of paths may include a mechanism for propelling unpowered transporter units. In some cases, rails or tracks of the paths may include embedded linear motor blocks, e.g., of linear synchronous motors (LSM), below the transporter units. The bottom of each transporter unit may include one or more magnets that are impelled by electromagnetic fields that are generated by the motor blocks. In other examples, a transporter unit may be propelled by latching onto a moving cable that is embedded in each path. Other propulsion methods may be used.

In some cases, e.g., when multiple parcels are to be delivered from a loading station to a single destination station, or when a single parcel is too large to be carried by a single transporter unit, two or more transporter units may be coupled to one another. After delivery of the parcels, the transporter units may be uncoupled from one another.

Typically, the sorting system is designed such that each track of a path of the network of paths is designed for one-way movement of transporter units. In some cases, a segment of the network of paths may include two parallel tracks along which transporter units may travel in opposite directions. A loop at an end of the parallel tracks of a path may enable a transporter unit to cross from one of the parallel tracks to the other while changing its direction of travel.

A junction between paths of a single level of the network of paths is typically in the form of a roundabout or traffic circle (which may have a circular, rounded rectangular, or other rounded and closed shape that enables continuous motion of transporter units) around which transporter units are moved in a single direction, e.g., along a single track having a closed shape. In the case of a three-dimensional network of paths on multiple levels, a junction of the network of paths may include one or more elevators, ramps, hoists, or other structure to enable a transporter unit to change its vertical position or height. Thus, a transporter unit may move from one path to another, whether both paths are at a single height or at different heights.

A loading station of a sorting system that includes the network of paths may include one or more loading devices for loading a parcel onto a transporter unit. In some cases, a loading device may be designed specifically for a particular type, or set of types, of parcel, transporter unit, or both. Similarly, the sorting system, e.g., at destination stations, may include one or more unloading devices, which may, in some cases, be specifically for a particular type, or set of types, of parcel, transporter unit, or both. In some cases, e.g., at junctions between intersecting paths or elsewhere, the sorting system may include one or more transfer devices for transferring a parcel from one transporter unit to another. Loading, unloading, or transfer devices may be mounted on the transporter units, may be mounted at fixed or movable positions along the network of paths, or both.

In one example, a transporter unit may include a spring-loaded (e.g., with a mechanical, hydraulic, or pneumatic spring) tiltable platform. The parcel may be loaded onto the platform at a loading station when the platform is horizontal and the spring is compressed. When the transporter unit arrives at the selected destination station, a latch, electromagnet, or other element that restrains the platform may be released. The spring may then decompress, tilting the platform so that the parcel slides off the transporter unit and into the destination station.

The network of paths may include one or more parking areas in which transporter units that are not currently in use may be stored or parked. A transporter unit may be removed from the parking area when the transporter unit is to be loaded with a parcel at a loading station.

After delivery of the parcel to a destination station, the unloaded transporter unit may be moved to a loading station for loading of another parcel. In the case where a sufficient number of transporter units are loaded or waiting to be loaded at a loading station (e.g., during an off-peak period), the unloaded transporter unit may be directed to a parking area. Parking areas may be located as close as practicable to a loading station. Therefore, an unloaded transporter unit in the parking area may be readily available, e.g., within a minimal travel time or travel distance, for loading at the loading station when required.

The network of paths may include one or more maintenance areas in which a transporter unit may be removed from, or loaded into, the network of paths, and on which other maintenance tasks may be performed.

A controller of the sorting system may be configured to calculate a most direct path between a loading station and the selected destination station at which the parcel is to be unloaded from the transporter unit. For example, a loaded transporter unit may travel along a thoroughfare path or a peripheral path until reaching a junction of that thoroughfare path with a distribution path along which the selected destination station is located. The transporter unit may then be diverted at that junction from the thoroughfare path to the distribution path. The transporter unit may then travel along the distribution path until reaching the selected destination station. The parcel may then be unloaded from the transporter unit to the destination station.

In cases where the sorting system includes multiple thoroughfare paths, the controller may calculate (e.g., using navigation algorithms known in the art) a shortest, most rapid, or most efficient route between the loading station and the destination station. For example, when heavy traffic is detected (e.g., in a case where sensors are distributed throughout the network of paths, or where one or more cameras and processors with image processing are configured to identify the position of each transporter unit) or anticipated (e.g., based on anticipated movement of transporter units on the network of paths) on one or more of the thoroughfare paths or peripheral paths, the controller may select a route with the shortest travel time instead of a shortest travel distance.

After the parcel is unloaded from the transporter unit, the controller may direct the transporter unit to travel along the most direct route from the destination station to a loading station (if required to deliver another parcel) or to a parking area. The empty transporter unit may be reloaded with another parcel at the loading station and controlled to travel to another selected destination station.

Examples of sorting systems as described herein, having two- or three-dimensional arrangements of paths, may be advantageous relative to (e.g., having a smaller footprint that but higher throughput than) other types of single dimensional sorting systems in which a vehicle for delivering parcels to destination stations is limited to travelling in a single direction along a single closed path that passes all destination stations. In a sorting system as described herein, a transporter unit may be controlled to travel along a maximally direct path between the loading station and the destination station, bypassing many or, in some cases, most of the other destination stations. For example, a maximally direct path may be calculated as the path with the shortest traversed distance or with the shortest travel time between the loading station and the destination station.

In a sorting system with a single closed path, the relative positions of all transporter units are fixed relative to one another. All transporter units may be required to continue travel along the closed path, whether loaded or not, in order not to interfere with movement of the other units. Stopping or removing one transporter unit for maintenance may affect the motion of all transporter units. Thus, even a transporter unit that is unloaded near the beginning of the closed path, soon after being loaded, is required to complete the entire circuit around the closed path before it can be reloaded. On the other hand, the two- or three-dimensional path network of a sorting system as described herein enables the transporter unit to travel along a direct route from the loading station to the destination station and back to the loading station. Diversion of a transporter unit to a parking or maintenance area enables a transporter unit to stop without blocking movement of other transporter units.

In a typical sorting system that includes a single closed path, increasing the number of destination stations may require adding additional sorting stages, e.g., with additional closed paths, thus requiring additional space. On the other hand, a sorting system as described herein, with multiple intersecting paths in two or three dimensions, may allow for a greater area density of destination stations (smaller footprint) and a higher throughput rate. The intersecting pattern geometry of the paths enables modular expansion or reduction of the network of paths, and thus addition or removal of destination stations.

Figure 1B:
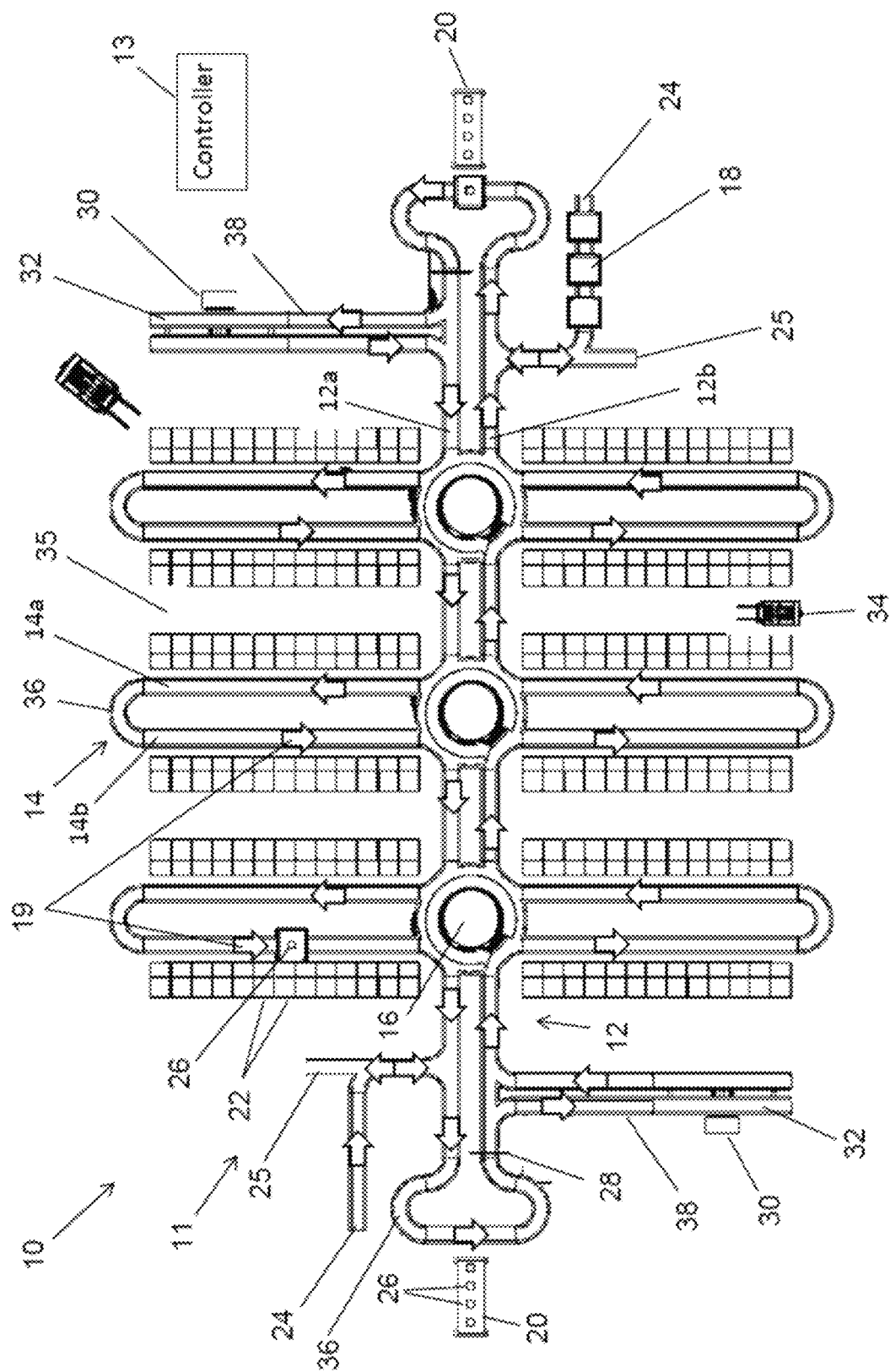
FIG. 1B schematically illustrates a layout of the level shown in FIG. 1A.

FIG. 1A schematically illustrates a level of a sorting system, in accordance with an embodiment of the present invention. FIG. 1B schematically illustrates a layout of the level shown in FIG. 1A.

Figure 2A:
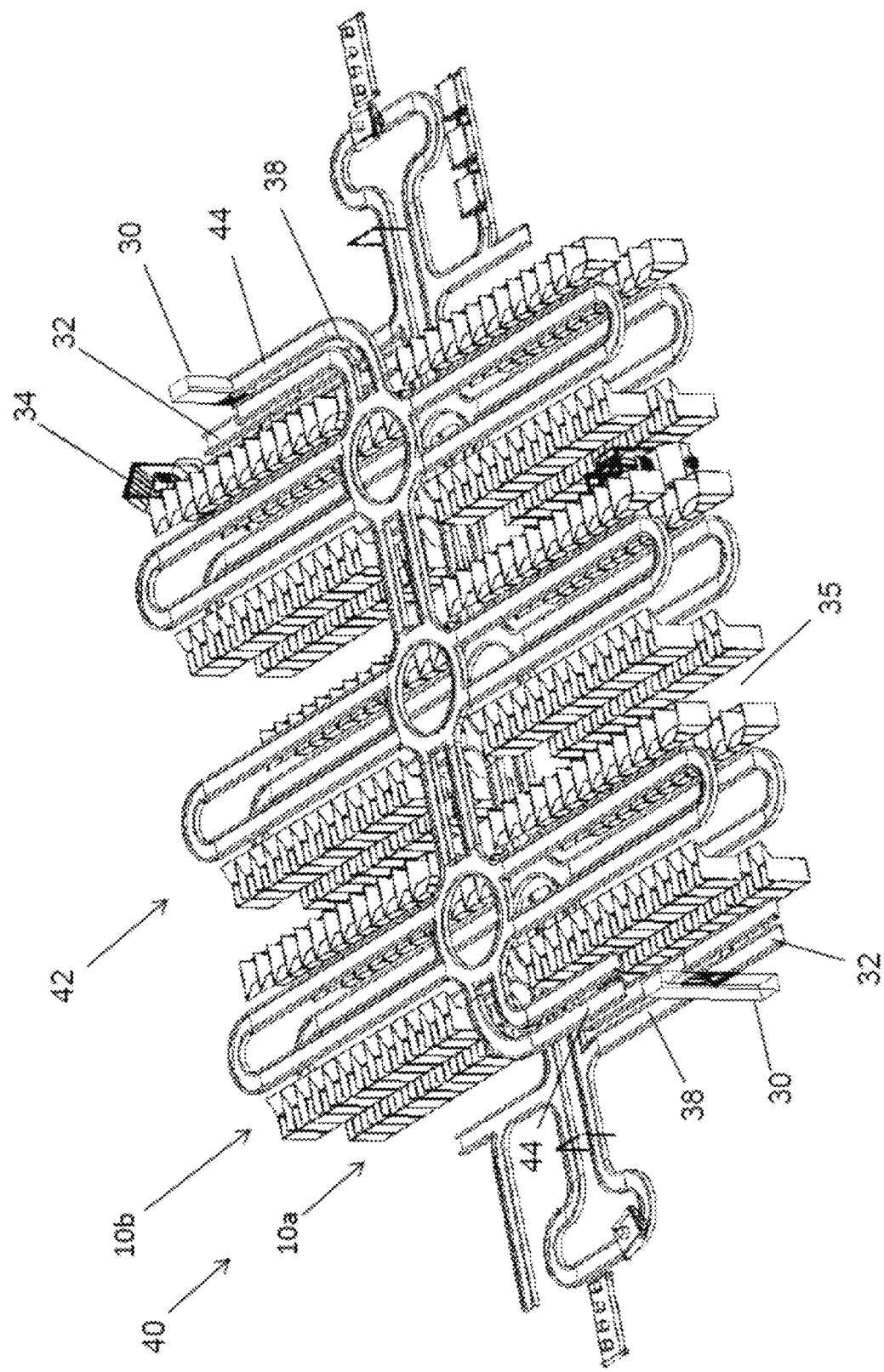
FIG. 2A schematically illustrates a bi-level sorting system, in accordance with an embodiment of the invention.

Sorting system level 10 includes a path network 11 along which transporter units 18 may travel. In the example shown, sorting system level 10 represents a single level of multilevel sorting system (e.g., as depicted in FIG. 2A). In the example shown, the paths are depicted as tracks, which may include rails, channels, or roadways on which transporter units 18 in the form of wheeled or otherwise bottom-supported (e.g., magnetically, pneumatically, by floatation, or otherwise supported) carts or other vehicles may travel. In other examples, the paths may include overhead rails or other overhead structure from which transporter units 18 may be suspended (e.g., mechanically or magnetically).

In the example shown, path network 11 includes a single thoroughfare path 12 that is intersected by a plurality of distribution paths 14 at junctions 16. In other examples, a path network may include multiple thoroughfare paths, a central thoroughfare region surrounded by peripheral distribution paths 14, or another arrangement. In the example shown, thoroughfare path 12 includes two separate one-way tracks 12a and 12b. Sorting system level 10 is configured such that transporter units 18 travel in a single and opposite directions along each track 12a and 12b. Similarly, each distribution path 14 includes two separate one-way tracks 14a and 14b. Arrows 19 schematically illustrate a possible direction of travel of transporter units 18 along each track 12a, 12b, 14a, or 14b. In other examples, the directions of some or all of arrows 19 may be reversed. As a typical example, each track 12a, 12b, 14a, or 14b may represent a rail or a railway track. In other examples, track 12a, 12b, 14a, or 14b may represent a lane of a roadway, an overhead rail, a channel, or other one-way path.

In other examples, each path of path network 11 may be configured to enable two-way traffic of transporter units 18 along the path. For example, each path may be sufficiently wide to enable two-way traffic of (e.g., self-propelled) transporter units 18 without collision. A controller of the sorting system, or of each transporter unit 18, may control motion of transporter units 18 to avoid collisions when travelling along a two-way path.

Each end of each thoroughfare path 12 or distribution path 14 terminates in a connecting loop 36 or in a junction 16. Thus, a transporter unit 18 that reaches an end of a track 12a or 12b of thoroughfare path 12, or of a track 14a or 14b of a distribution path 14, that terminates in a connecting loop 36 may continue to travel around connecting loop 36 to reverse direction and travel in the opposite direction along track 12b or 12a, or track 14b or 14a, respectively. When a transporter unit 18 reaches a junction 16 when travelling along a track of a path of path network 11 (e.g., along track 12a or 12b of thoroughfare path 12, or along track 14a or 14b of a distribution path 14), the transporter unit 18 may be controlled to continue to travel along that original track, to reverse direction by travelling around that junction 16 to the opposite track of the original path, or to turn to a track of an intersecting path (e.g., to a track of distribution path 14 or of thoroughfare path 12, respectively).

In the example shown, each junction 16 is a track having a substantially circular closed form that functions as a roundabout or traffic circle. Thus, a transporter unit 18 that enters junction 16 may continue to travel about the roundabout of junction 16 until an intersection of junction 16 with a track of a path along which transporter unit 18 is to continue to travel. In other examples, a junction may be otherwise designed (e.g., with rounded rectangular or polygonal roundabouts, by including a turntable mechanism, by providing transporter units 18 with steering mechanisms capable of turning at right or obtuse angles, or another design or mechanism) to enable diversion or a transporter unit 18 from one path to an intersecting path.

In the example shown, path network 11 is designed such that when a transporter unit 18 is travelling along a path in the direction indicated by the corresponding arrow 19, any intersection between two intersecting paths or between a path and a junction 16 forms an acute angle opening toward the direction of travel. In this manner, a switching mechanism (e.g., a rotation through an acute angle of a steering mechanism of transporter unit 18, of a rotatable rail of the path, or of another switching mechanism) may divert the direction of travel from one path to the intersecting path, e.g., without requiring slowing of a speed of travel of transporter unit 18. In some examples, a switching mechanism may include an electromagnetic power switching mechanism.

In the example shown, a loading station 20 is located at a connecting loop 36 at each end of thoroughfare path 12. In other examples, one or more loading stations 20 may be located elsewhere within path network 11. Each loading station 20 is configured to load one or more parcels 26 on a transporter unit 18. For example, a loading station 20 may include one or more of a conveyer belt, hoist, robotic arm, crane, chute, or other mechanism for loading a parcel 26 onto a transporter unit 18.

In the example shown, destination stations 22 are distributed along distribution paths 14. In other examples, destination stations 22 may be otherwise distributed along path network 11 or sorting system level 10. In the example shown, each destination station 22 includes a collection bin and/or a sack into which a parcel 26 may be deposited, e.g., via a deposit chute 23. In other examples, a destination station 22 may include a cage, a shelf, or another structure or region for holding a parcel 26. For example, destination station 22 may include labelling that identifies destination station 22 to a sensor of transporter unit 18, or a sensor that detects labelling on transporter unit 18 or a parcel 26. Alternatively or in addition, a navigation system of each transporter unit 18, or of the sorting system, may monitor a location of each transporter unit 18 relative to a selected destination station 22 (as well as to all other transporter units 18 that are currently located on path network 11) to which that transporter unit 18 is to deliver parcel 26. Destination station 22, transporter unit 18, or another component of the sorting system may be configured to remove parcel 26 from transporter unit 18 to destination station 22. For example, a surface of transporter unit 18 on which parcel 26 is supported may be tilted, a pushing or grabbing mechanism may remove parcel 26 from transporter unit 18, or another mechanism, structure, or device may move a parcel 26 from a transporter unit 18 to an appropriate destination station 22.

In the example shown, sorting system level 10 includes logistic lanes 35 between destination paths 14 to enable access by a parcel-handling vehicle 34 to access destination stations 22. For example, parcel-handling vehicle 34 may be operated to remove parcels 26 from a destination station 22 for delivery to a target destination (e.g., a final destination, a delivery or transport vehicle or service, or elsewhere).

Path network 11 may include one or more parking areas 18 and one or more maintenance areas 25. For example, a transporter unit 18 may remain in a parking area 18 when that transporter unit 18 is not loaded with a parcel 26, and when there is no need for loading a parcel 26 onto that transporter unit 18. A transporter unit 18 may be moved to a maintenance area 25 to enable performance of maintenance on that transporter unit 18, to enable removal of a transporter unit 18 from path network 11, or to enable addition of a transporter unit 18 to path network 11, without interfering with operation of other transporter units 18 that are traveling or otherwise operating on path network 11.

Reader 28 is configured to read one or more identifying labels of parcel 26, transporter unit 18, or both. The identifying label may include one or more optical (e.g., alphanumeric characters, symbols, one- or two-dimensional barcodes, color patterns, emitted light pattern (e.g., by light emitting diodes), or other optical labelling), electromagnetic (e.g., RFID tags, electromagnetic transmitters, or other electromagnetic labelling), acoustic, or other readable labelling. Reader 28 may include one or more devices (e.g., optical scanner, RFID reader, acoustic transponder, or other device) for reading or interrogating the labelling. The labelling may indicate a destination station 22 to which parcel 26 is to be delivered. In the example shown, reader 28 is mounted on a bridge above a path (e.g., thoroughfare path 12) of path network 11 and is configured to read labelling immediately after transporter unit 18 departs from loading statin 20. In other examples, sensors of reader 28, or of additional readers, may be placed alongside or under a path of path network 11, and elsewhere along path network 11.

Controller 13 is configured to control operation of components of the sorting system, including sorting system level 10. For example, controller 13 may include one or more computers or other processing units. The processors of controller 13 may be located at one or more fixed locations within or remote to the sorting system. Alternatively or in addition, some or all of the processors of controller 13 may be located on transporter units 18.

Controller 13 may be configured to calculate a most direct route along path network 11 from a loading station 20, at which a parcel 26 is placed on a transporter unit 18, to a destination station 22 for delivery of that parcel 26. In some cases, calculation of the most direct route may include minimizing travel time, e.g., utilizing the current or calculated future locations of other transporter units 18 within path network 11, from loading station 20 to destination station 22.

Path network 11 may include an arrangement of sensors (e.g., optical, acoustic, electromagnetic, electromechanical, or otherwise) that are configured to continuously monitor the position of each transporter unit 18. For example, such sensors may be arranged along paths of path network 11 at regular or irregular intervals. Alternatively or in addition, one or more cameras or other imaging devices may be configured to acquire images of all transporter units 18 on path network 11. Acquired images may be analyzed to determine the location of each transporter unit 18 on path network 11. Alternatively or in addition, each transporter unit 18 may be provided with one or more navigation sensors or devices to determine its position relative to path network 11 (or to a local or global coordinate system relative to which the positions of paths of path network 11 are known). Controller 13 may be configured to receive signals from the sensors or devices and determine the positions of all transporter units 18 that are located on path network 11.

In the example shown, sorting system level 10 is one level of a multilevel sorting system. A transporter unit 18 that is to be raised or lowered to another level of the sorting system may be moved to elevator approach path 38 and onto lift 32 of elevator 30.

Figure 2B:
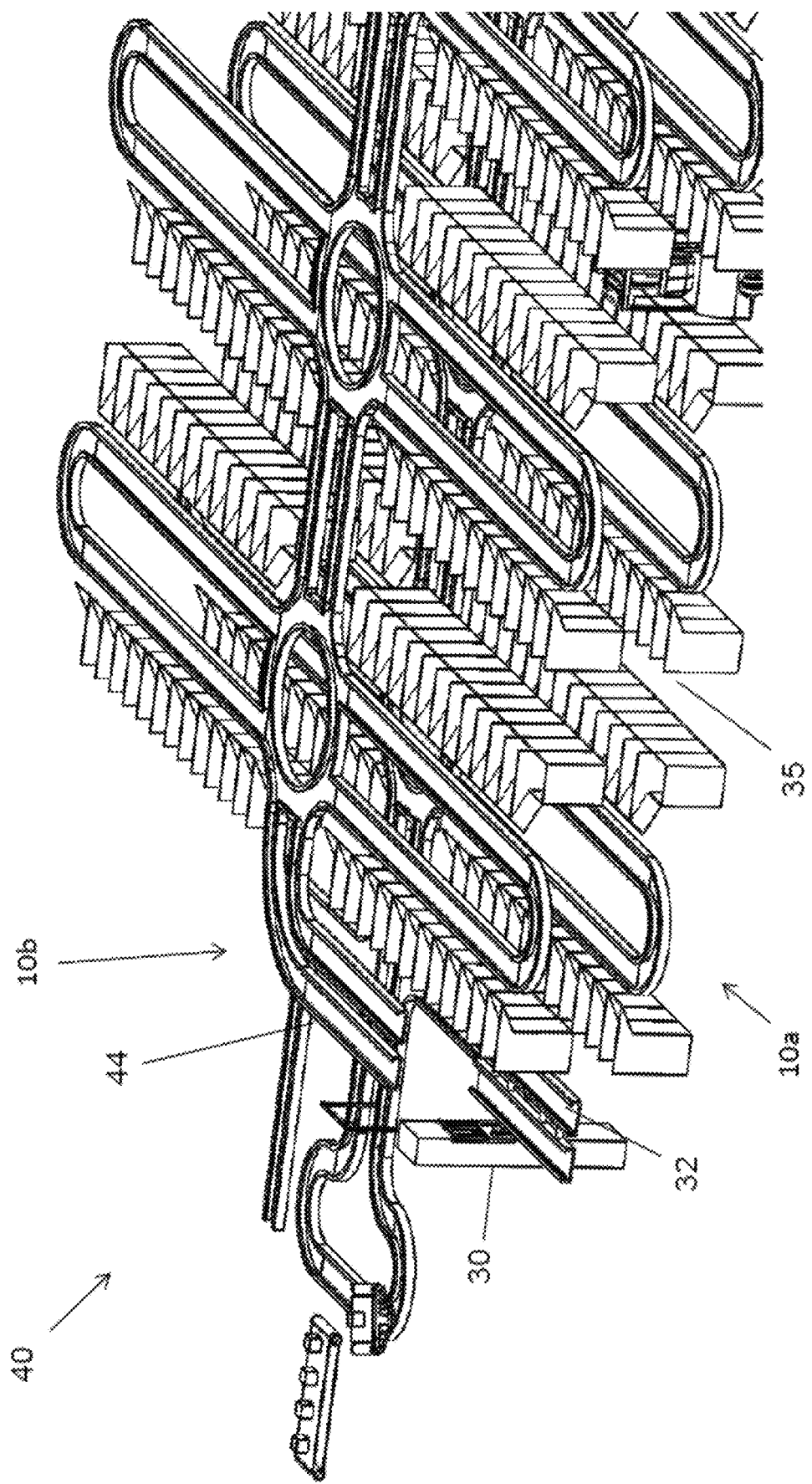
FIG. 2B schematically illustrates a vertical junction of the sorting system shown in FIG. 2A.
Figure 2C:
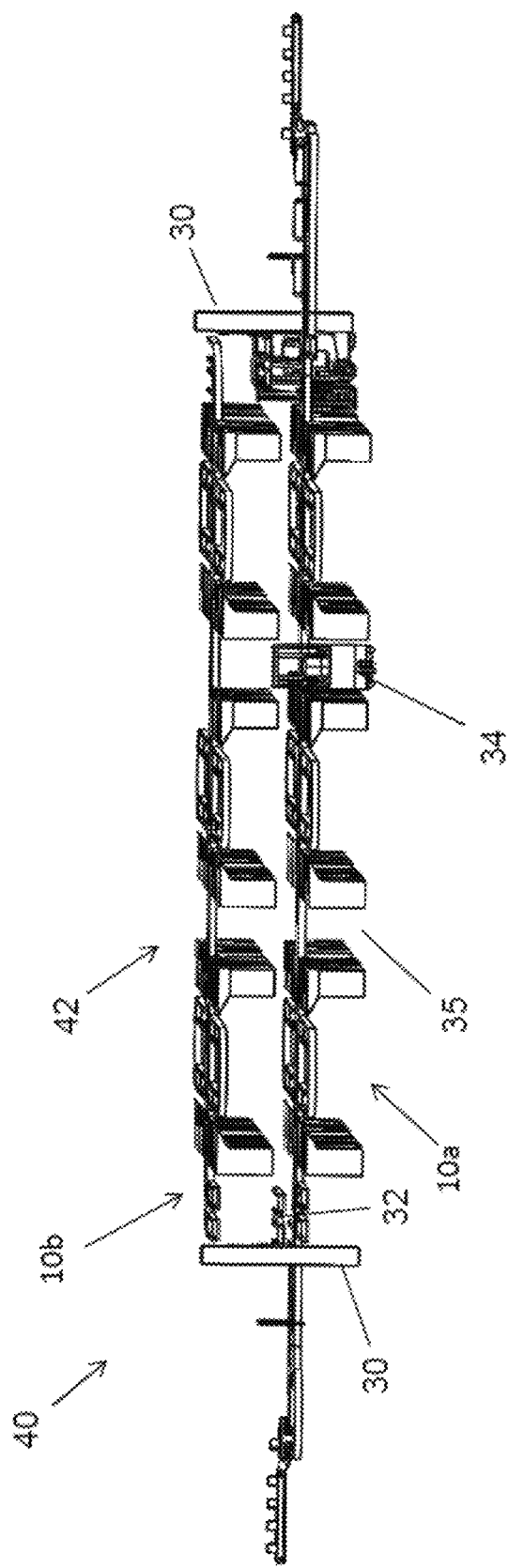
FIG. 2C is a schematic side view of the sorting system shown in FIG. 2A.

FIG. 2A schematically illustrates a bi-level sorting system, in accordance with an embodiment of the invention. FIG. 2B schematically illustrates a vertical junction of the sorting system shown in FIG. 2A. FIG. 2C is a schematic side view of the sorting system shown in FIG. 2A.

Bi-level path network 42 of sorting system 40 includes lower level 10*a* (corresponding to sorting system level 10 of FIGS. 1A-1B) and upper level 10*b*. In other examples, a sorting system may include three or more levels.

In the example shown, the layout of upper level 10*b* is identical to that of lower level 10*a*, except that all loading stations 20, parking areas 24, and maintenance areas 25 are located on lower level 10*a*. Destination stations 22 are located along both lower level 10*a* and upper level 10*b*. In other examples, some or all loading stations 20, parking areas 24, and maintenance areas 25 may be located on upper levels, and paths of upper levels may be laid out differently than at lower levels. In the example shown, logistic lanes 35 are located below lower level 10*a*. In other examples, logistic lanes 35 may be located level with or higher than lower level 10*a*.

In some cases, destination stations 22 on upper level 10*b* may be identical to destination stations 22 on lower level 10*a* (e.g., a single tall bin). In this case, the bi-level network of paths may reduce traffic congestion along the distribution paths 14 on the different levels. In other cases, destination stations 22 on upper level 10*b* may be different from those on lower level 10*a*, allowing for increasing the number of destination stations 22 in sorting system 40.

In the example shown, a vertical junction between upper level 10*b* and lower level 10*a* includes elevator 30. In other example, a vertical junction may include a ramp (e.g., an upwardly or downwardly sloping path or track, or another arrangement for enabling a transporter unit 18 to travel between levels of sorting system 40.

In the example shown, elevator 30 is configured to raise lift 32 from elevator approach path 38 of lower level 10*a* to elevator approach path 44 of upper level 10*b*, or vice versa. For example, in FIG. 2A, both lifts 32 are shown at the elevation of elevator approach path 38 of lower level 10*a*. In FIG. 2B, lift 32 is shown raised to an elevation between that of lower level 10*a* and that of elevator approach path 44 of upper level 10*b*.

Figure 3A:
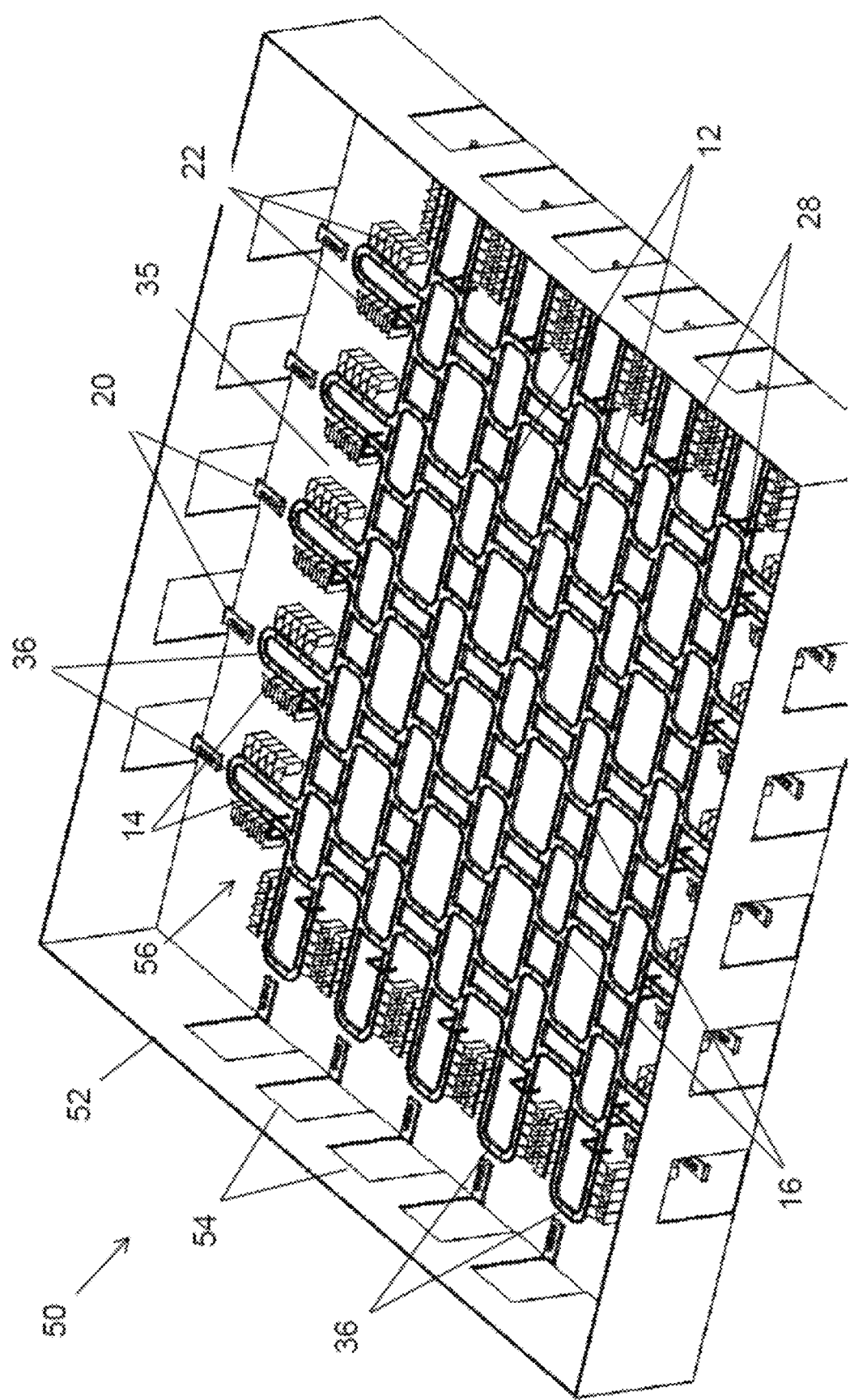
FIG. 3A schematically illustrates a sorting system in which destination stations are located at the periphery.
Figure 3B:
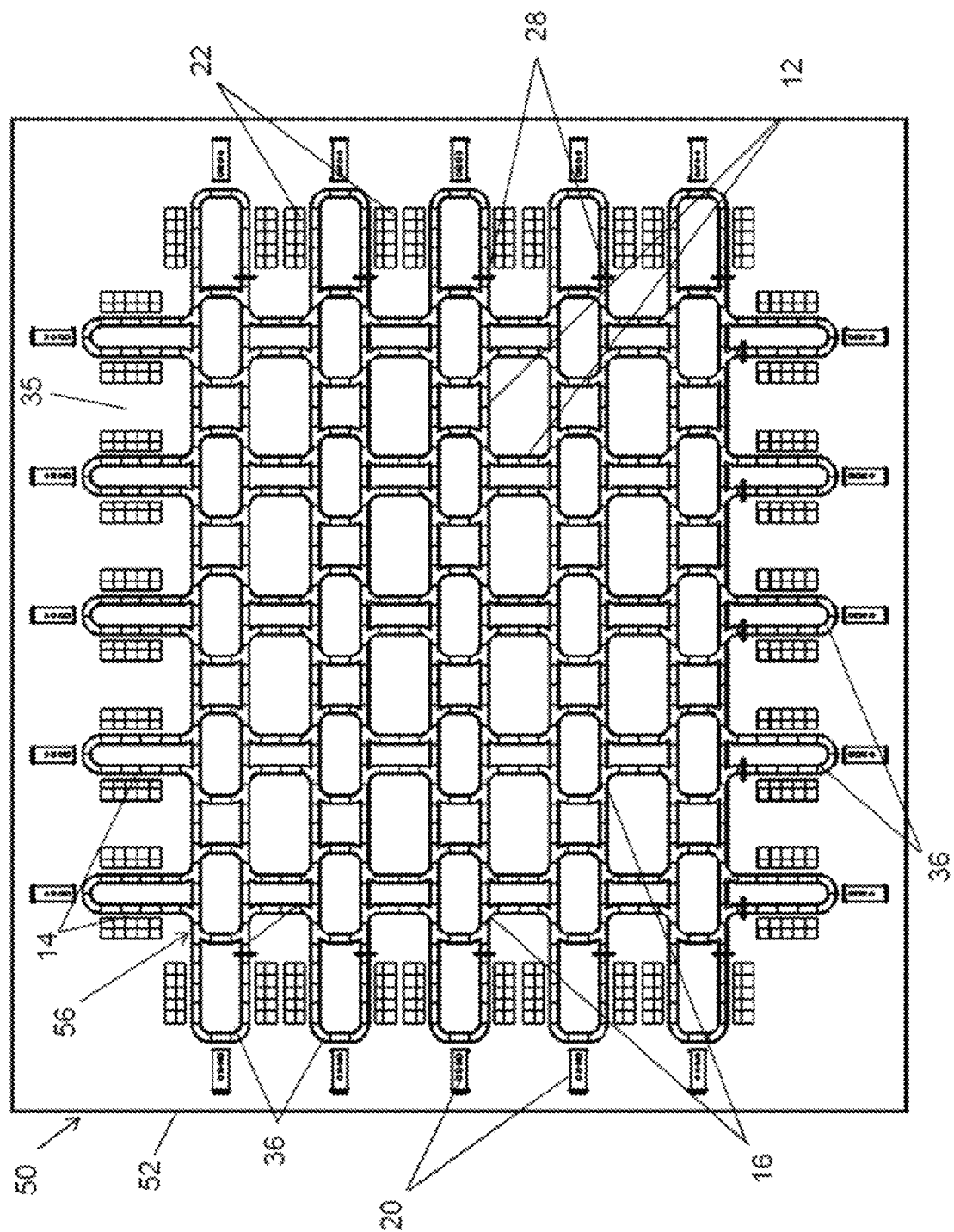
FIG. 3B schematically illustrates a layout of the system shown in FIG. 3A.

FIG. 3A schematically illustrates a sorting system in which destination stations are located at the periphery. FIG. 3B schematically illustrates a layout of the system shown in FIG. 3A.

In the example shown, sorting system 50 is located within enclosure 52 (e.g., a warehouse or other building) and is accessible via openings 54. In sorting system 50, distribution paths 14 along which destination stations 22 are arranged are located at the periphery of central path region 56. Similarly, loading stations 20 are located at connecting loops 36 at the distal ends of distribution paths 14, near openings 54. In other examples, loading stations 20 may be otherwise located.

In the example shown, the distal end of each distribution path 14 is located at an opening 54. Such an arrangement may enable access by a delivery vehicle (e.g., truck, van, cargo cart, forklift, crane, cherry picker, cargo boat, or other transport vehicle) to access the loading station 20 or the destination stations 22 at that opening 54.

In the example shown, central path region 56 is arranged in the form of a grid of thoroughfare paths 12 intersecting substantially at right angles. The intersecting thoroughfare paths 12 meet at junctions 16. In the example shown, junctions 16 are approximately rectangular, deviating outward from thoroughfare paths 12 that are oriented in one direction (vertically in FIG. 3B). In other examples, junctions 16 may be otherwise shaped (e.g., circular as in FIG. 1A, square, oval, polygonal, or otherwise).

The ends of each thoroughfare path 12 terminate in two distribution paths 14 in the forms of extensions of thoroughfare path 12 at the periphery of central path region 56. Other arrangements of paths are possible (e.g., diagonal intersections between some or all of the paths, curved or bent paths, or other arrangements).

In the example shown, the lateral separation between adjacent parallel thoroughfare paths 12 that extend in one dimension (vertically in FIG. 3B) is greater than between adjacent thoroughfare paths 12 that extend in the other dimension (horizontally in FIG. 3B). In other examples, the separations between adjacent thoroughfare paths 12 may be substantially equal in both dimensions.

The grid arrangement of thoroughfare paths 12 in sorting system 50 may enable increased flexibility in selection of a route over another arrangement of the paths, e.g., as in sorting system level 10. The grid arrangement in sorting system 50 may also be used to sort parcels from one loading station 20 (e.g., at one end of enclosure 52) to other loading stations 20 (e.g., at other ends of enclosure 52, and possibly functioning as destination stations). For example, such sorting may facilitate further transport of parcels either within sorting system 50, or to another sorting system (e.g., via an opening 54 of enclosure 52).

Figure 4:
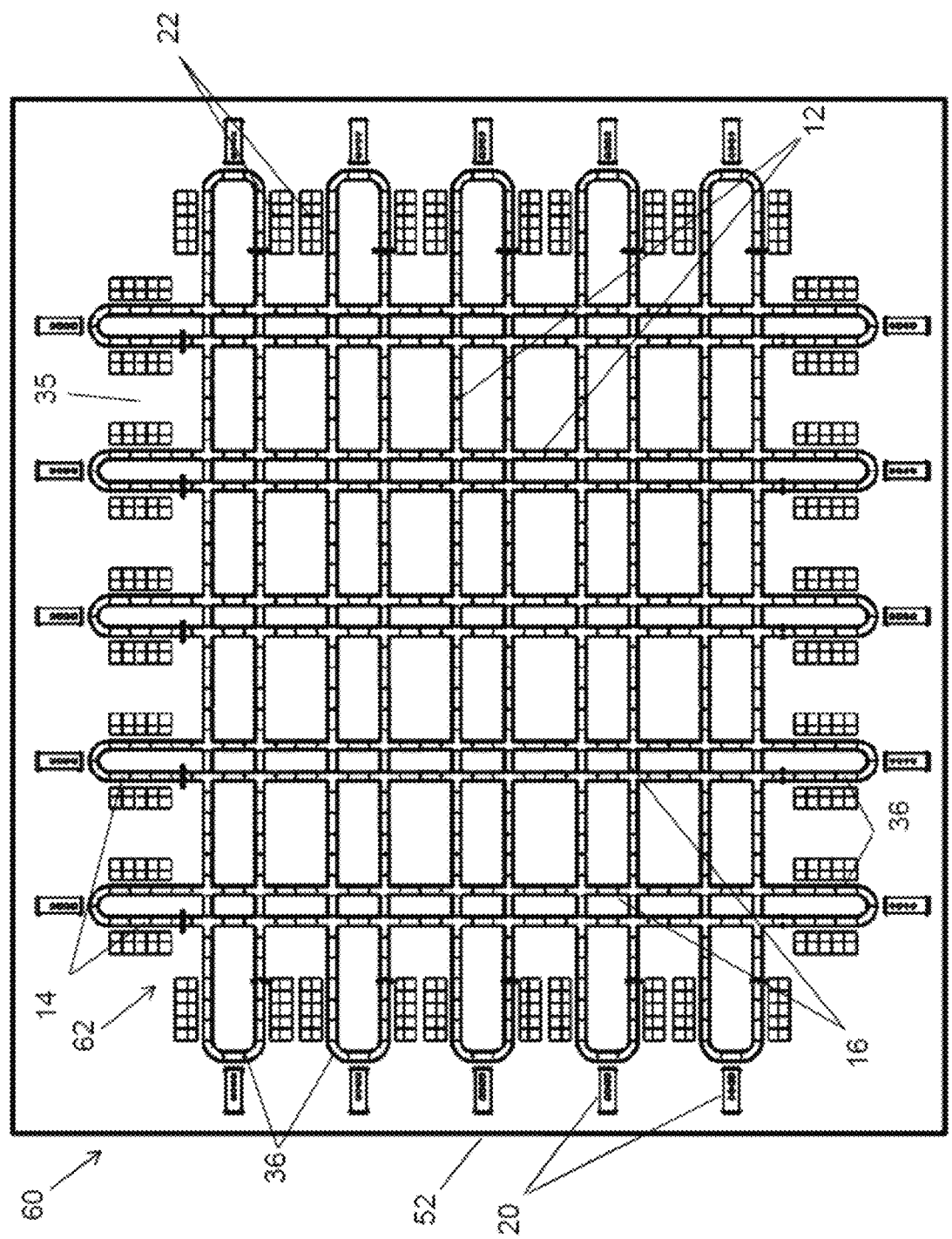
FIG. 4 schematically illustrates a variant layout of the system shown in FIG. 3B.

FIG. 4 schematically illustrates a variant layout of the system shown in FIG. 3B.

In central path region 62 of sorting system 60, junctions 16 are shown as aligned with all thoroughfare paths 12. Thus, a transporter unit 18 that traverses a junction 16 along one thoroughfare path 12 without turning to an intersecting thoroughfare path 12 may continue without turning.

Figure 5:
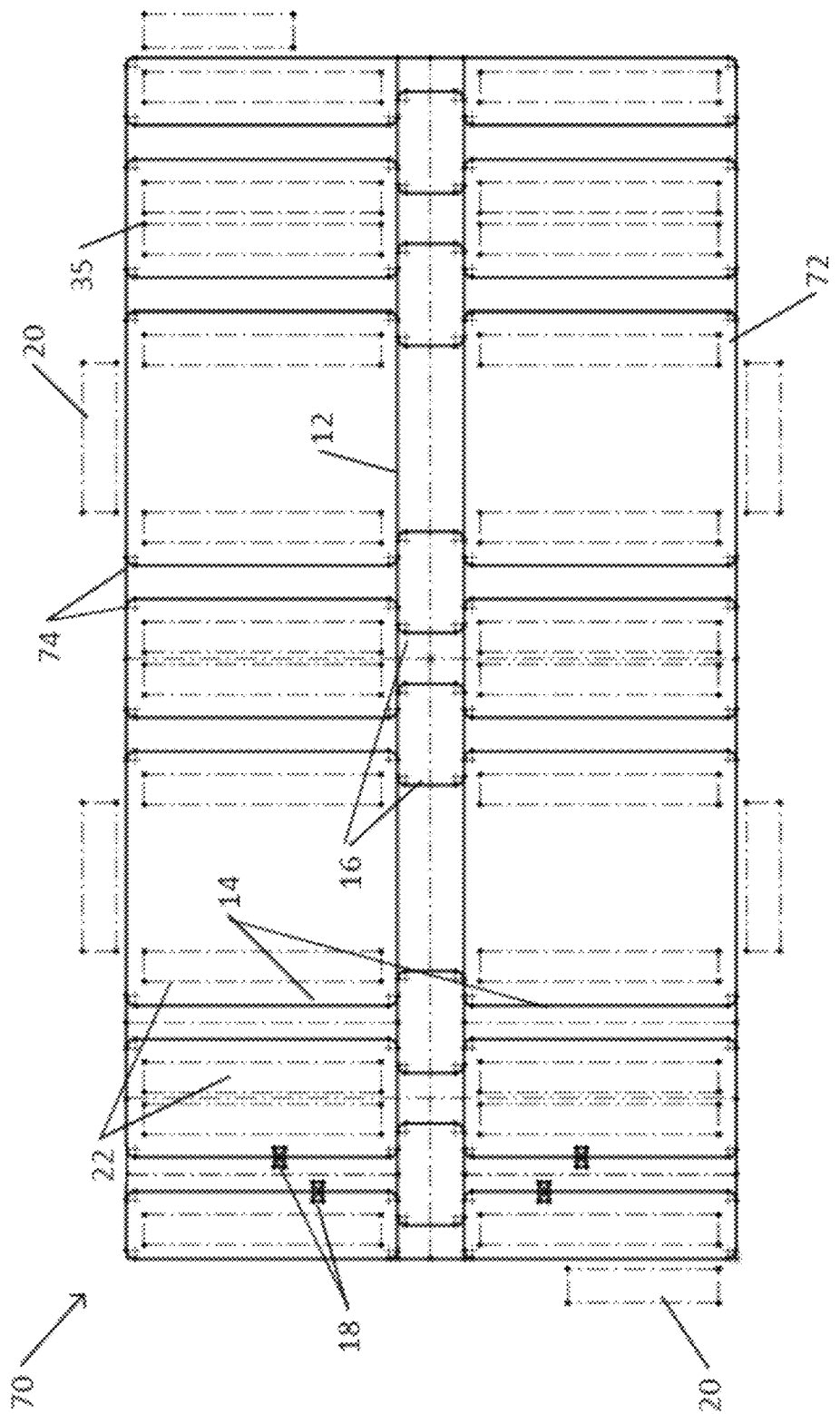
FIG. 5 schematically illustrates a layout of a variant of the system shown in FIG. 1B, including a peripheral path.

FIG. 5 schematically illustrates a layout of a variant of the system shown in FIG. 1B, the layout including a peripheral path.

In path network 70, peripheral path 72 extends about the periphery of, and surrounds interior paths of, (e.g., one or more thoroughfare paths 12 and a plurality of distribution paths 14) path network 70. In the example shown, loading stations 20 are arranged along peripheral path 72. A transporter unit 18 may travel along peripheral path 72 to a peripheral junction 74 with thoroughfare path 12 or with a distribution path 14. In the example shown, the interior of path network 70 is similar to that of path network 11 (FIG. 1B). In other examples, the interior of path network 70 may be similar to the path network of sorting system 50 (FIG. 3B), sorting system 60 (FIG. 4), or another path network. Peripheral path 70 may expedite delivery by enabling a transporter unit 18 to bypass large regions of path network 70, without traversing many or all thoroughfare paths 12 and junctions 16.

Figure 6:
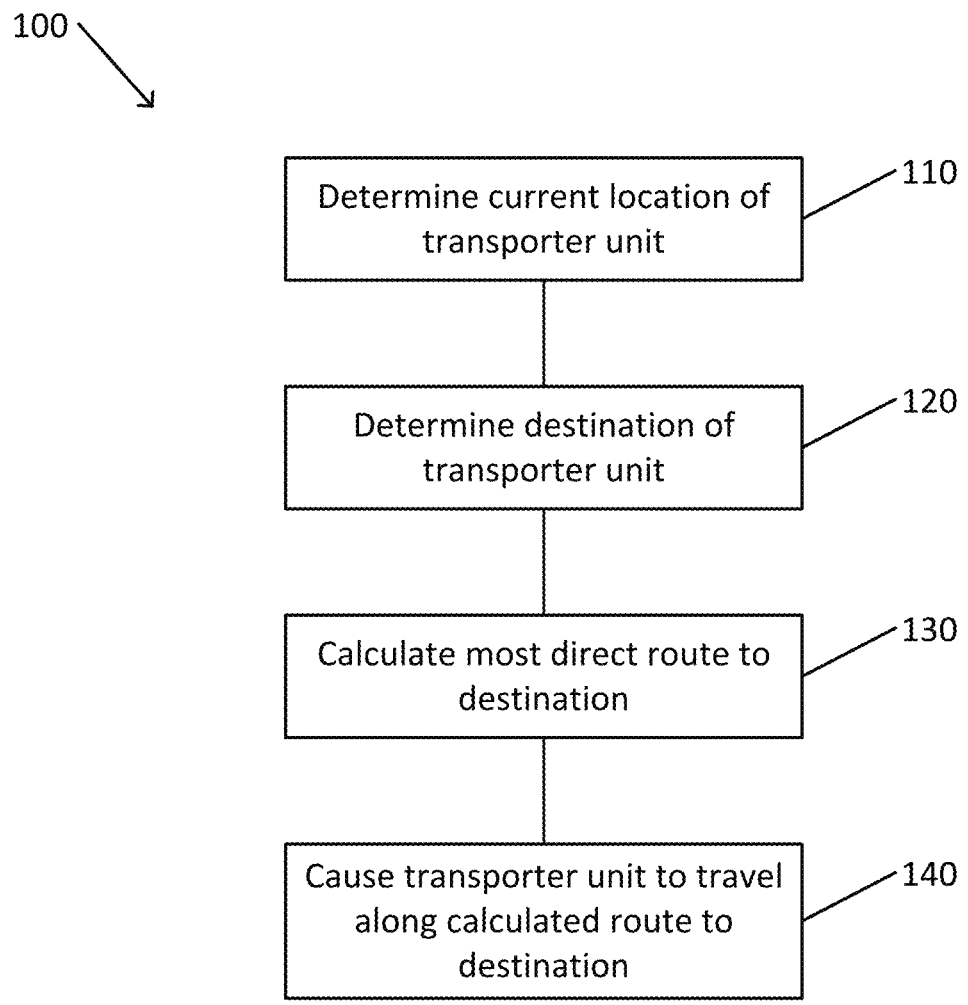
FIG. 6 is a flowchart depicting a method for controlling travel of a transporter unit of a sorting system in accordance with an embodiment of the invention.

FIG. 6 is a flowchart depicting a method for controlling travel of a transporter unit of a sorting system in accordance with an embodiment of the invention.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Control method 100 may be executed by controller 13 of a sorting system as describe herein. Control method 100 may be executed, e.g., when a parcel 26 is loaded onto a transporter unit 18 at a loading station 20, or is removed from transporter unit 18 at a destination station 22. In some cases, control method 100 may be executed during travel of transporter unit 18 along a path network of the sorting system. For example, control method 100 may be executed periodically to evaluate current traffic conditions along some or all paths, or may be executed in response to a detected change in traffic conditions.

A current location of transporter unit 18 may be determined (block 110). For example, controller 13 may receive signals that are indicative of the current location of transporter unit 18 from one or more sensors or navigation devices. The current location may be a loading station 20, the location of a reader 28, a destination station 22, or another location.

A destination for transporter unit 18 may be determined (block 120). For example, labelling on a loaded parcel 26 may indicate a final destination for parcel 26. Controller 13 may determine a destination station 22 for parcels 26 with that final destination. As another example, after unloading parcel 26 at destination station 22, controller 13 may determine a loading station 20 at which transporter unit 18 is to be loaded with another parcel 26, a parking area 24 at which transporter unit 18 is to be parked, or a maintenance area 25 at which maintenance is to be performed on transporter unit 18. When there are more than one loading station 26, parking area 24, or maintenance area 25, controller 13 may select one of these as a destination for a transporter unit 18.

Controller 13 may calculate a most direct route to the determined destination (block 130). For example, the most direct route may include a shortest travel distance to the destination, a route with the shortest travel time to the destination (e.g., taking into account current or projected traffic conditions, projected travel speed on each path, or other conditions), a route requiring the lowest expenditure of energy, or otherwise. The calculated route includes instructions regarding a continued direction of travel at each junction 16 that is encountered by transporter unit 18.

Controller 13 may then cause transporter unit 18 to be moved (e.g., either externally propelled or self-propelled) along the calculated most direct route to the destination. If the destination is a destination station 22, parcel 26 may be removed from transporter unit 18.

Different embodiments are disclosed herein. Features of certain embodiments may be combined with features of other embodiments such that certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A sorting system comprising:
   one or a plurality of transporter units;
   at least one loading station for loading a parcel onto a transporter unit of the one or a plurality of transporter units;
   a plurality of destination stations;
   a network of paths, the network of paths comprising:
      at least one thoroughfare path;
      a plurality of distribution paths, the plurality of destination stations being distributed along each distribution path of the plurality of distribution paths;
   each path of the network of paths comprising at least one track and including a plurality of junctions where at least two of the paths intersect, each transporter unit being controllable to travel along the paths of the network of paths and to continue travelling along one of said at least two paths at a junction of the plurality of junctions;
   wherein each distribution path comprises two ends, a first end intersecting a thoroughfare path, and a second end terminating in a connecting loop;
   wherein each intersection between two intersecting paths or between a path and a junction forms an acute angle opening toward a new direction of travel, configured to divert transporter units from an existing direction of travel to a new direction of travel; and
   a controller configured to calculate a route within the network of paths between a loading station of said at least one loading station and a selected destination station of the plurality of destination stations, and to control the transporter unit to travel along the calculated route.

2. The system of claim 1, wherein the network of paths comprises paths on at least two levels at different heights, and wherein the plurality of junctions comprises at least one vertical junction between a path one of the levels and a path on another of the levels.

3. The system of claim 2, wherein the vertical junction comprises an elevator.

4. The system of claim 1, wherein a loading station of said at least one loading station is located at an end of the thoroughfare path.

5. The system of claim 1, wherein each distribution path of the plurality of distribution paths is located at an end of a thoroughfare path of a grid of intersecting thoroughfare paths.

6. The system of claim 5, wherein a loading station of said at least one loading station is located at a distal end of a distribution path of the plurality of distribution paths.

7. The system of claim 1, further comprising a reader configured to read a label on the parcel.

8. The system of claim 7, wherein the controller is configured to select a destination station for delivery of the parcel based on contents of the label.

9. The system of claim 1, wherein a destination station of the plurality of destination stations comprises a bin or sack.

10. The system of claim 1, wherein the transporter unit comprises a vehicle that is configured to travel on the network of paths.

11. The system of claim 1, wherein the network of paths is configured to enable travel of the transporter unit in a single direction along each track of said at least one track.

12. The system of claim 11, wherein a path of the network of paths comprises two tracks, wherein the direction of travel along one of the two tracks is opposite the direction of travel along the other track of the two tracks.

13. The system of claim 12, wherein the two tracks terminate in a loop that enables the transporter unit to travel from one of the two tracks to the other.

14. The system of claim 1, wherein a junction of the plurality of junctions comprises a roundabout.

15. The system of claim 1, wherein the network of paths comprises a parking area for parking at least one transporter unit.

16. The system of claim 1, wherein the network of paths comprises a maintenance area to enable maintenance on a transporter unit.

17. The system of claim 1, wherein the controller is configured to detect a location of the transporter unit on the network of paths.

18. The system of claim 1, wherein the controller is configured to calculate the route such that a travel time of the transporter unit along the network of paths from the loading station to the selected destination station is minimized.

19. The system of claim 1, wherein a path of the network of paths comprises a peripheral path that surrounds other paths of the network of paths.

* * * * *